July 11, 1933.   B. G. CARLSON   1,918,082
AUTOMATIC PILOT FOR DIRIGIBLE CRAFT
Filed Aug. 25, 1931   7 Sheets-Sheet 2
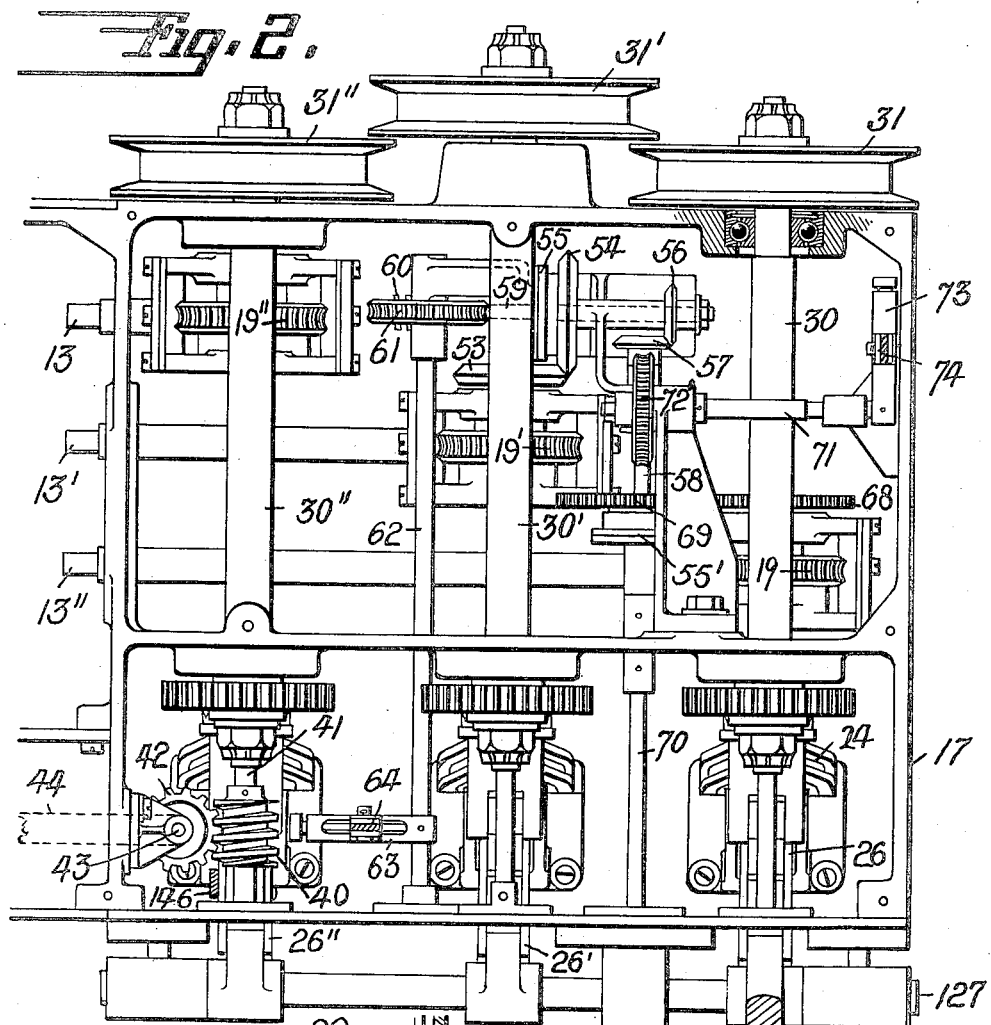
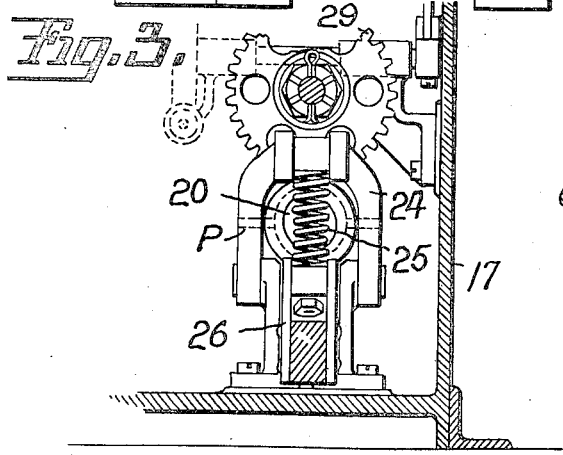
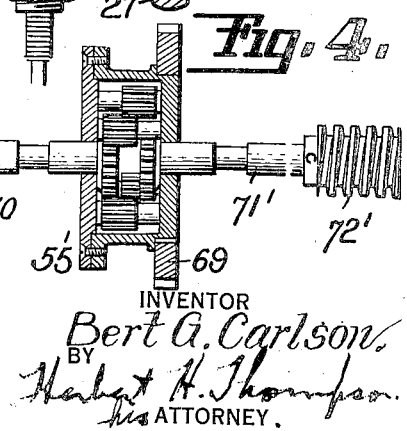
INVENTOR
Bert G. Carlson,
BY
Herbert H. Thompson
his ATTORNEY.

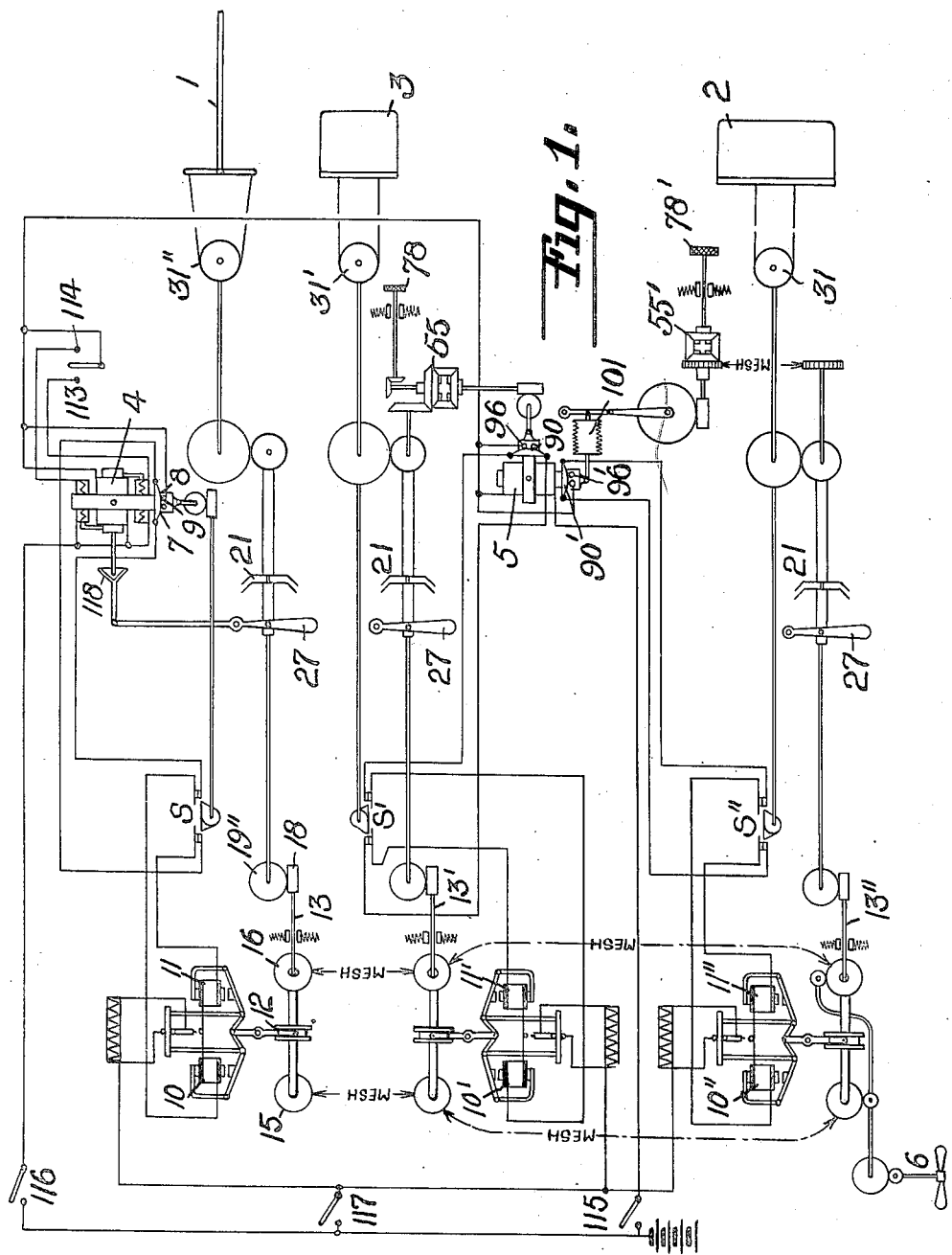

July 11, 1933.  B. G. CARLSON  1,918,082
AUTOMATIC PILOT FOR DIRIGIBLE CRAFT
Filed Aug. 25, 1931   7 Sheets-Sheet 3
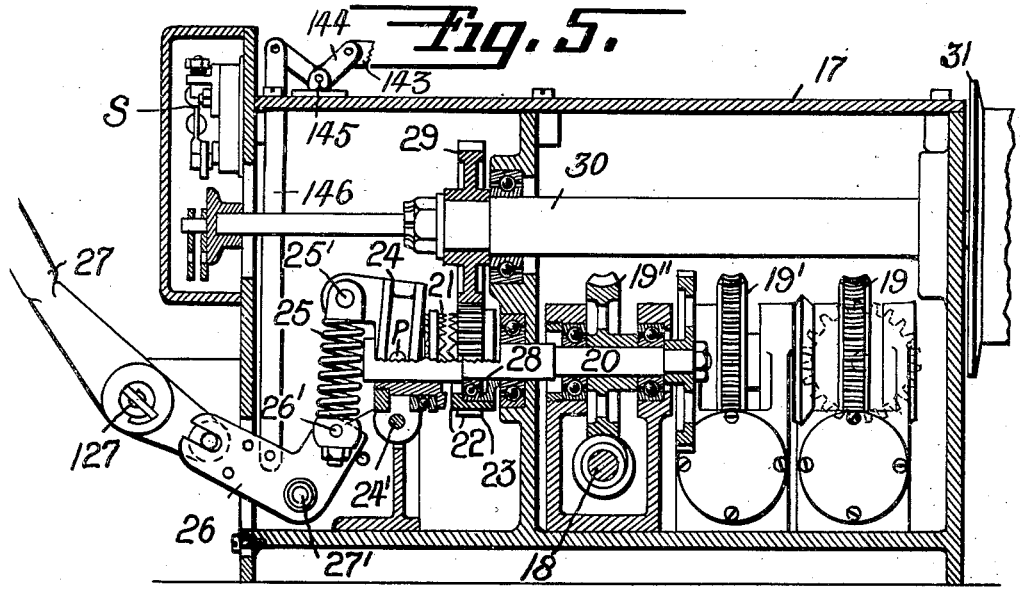
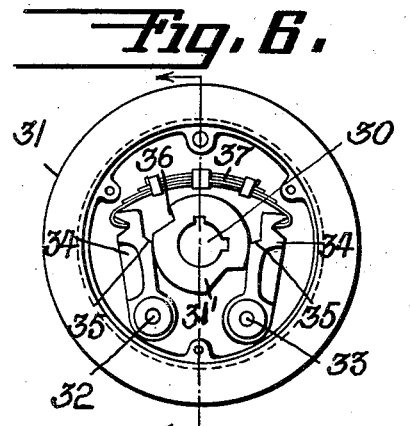
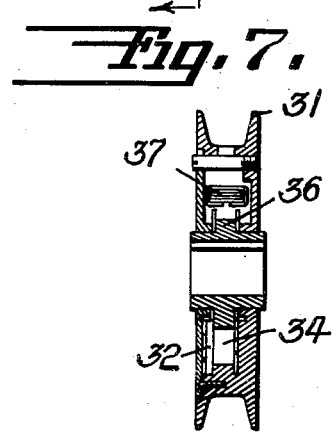
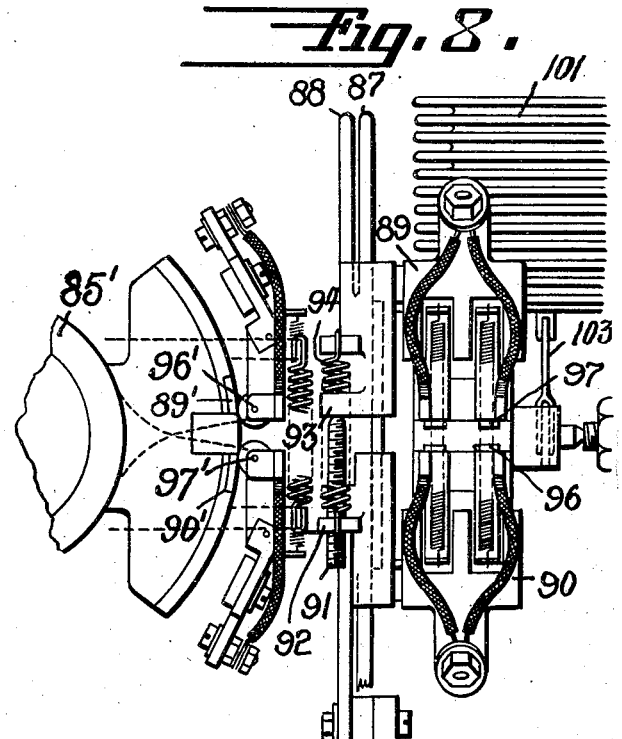
INVENTOR
Bert G. Carlson
BY Hubert H. Thompson
his ATTORNEY.

July 11, 1933.  B. G. CARLSON  1,918,082
AUTOMATIC PILOT FOR DIRIGIBLE CRAFT
Filed Aug. 25, 1931    7 Sheets-Sheet 4
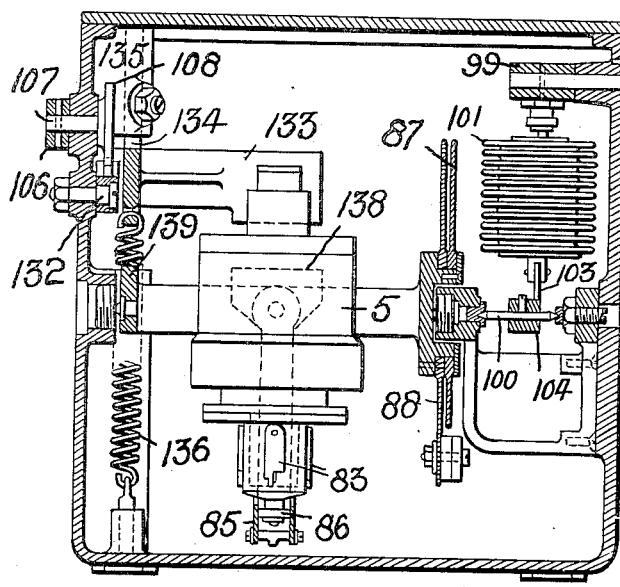
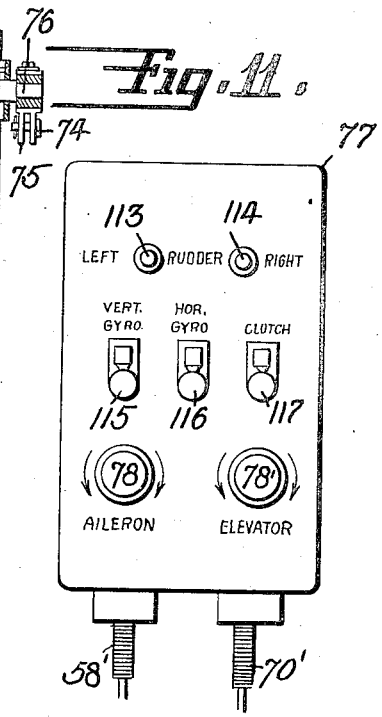
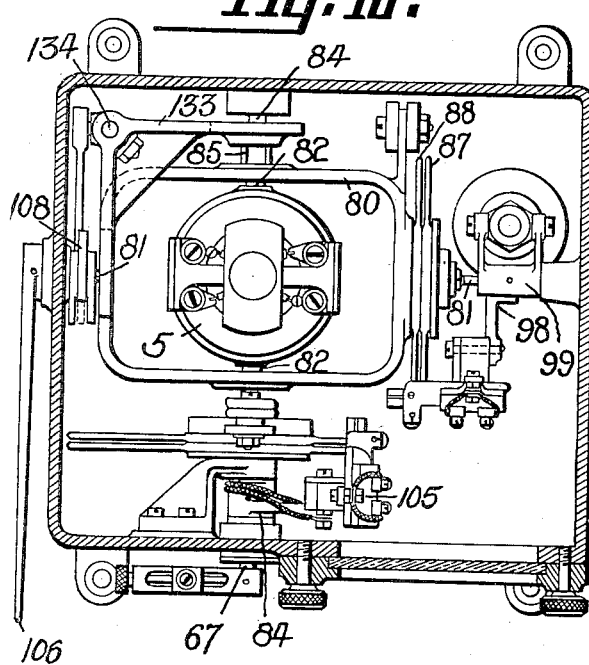
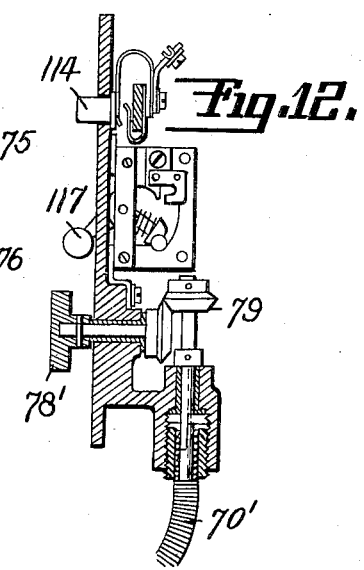
INVENTOR
Bert G. Carlson.
BY
his ATTORNEY.

July 11, 1933.  B. G. CARLSON  1,918,082
AUTOMATIC PILOT FOR DIRIGIBLE CRAFT
Filed Aug. 25, 1931   7 Sheets-Sheet 5

INVENTOR
Bert G. Carlson
BY Herbert H. Thompson
   his ATTORNEY.

July 11, 1933.   B. G. CARLSON   1,918,082
AUTOMATIC PILOT FOR DIRIGIBLE CRAFT
Filed Aug. 25, 1931   7 Sheets-Sheet 6

INVENTOR
Bert G. Carlson.
BY
Herbert H. Thompson
his ATTORNEY.

July 11, 1933.  B. G. CARLSON  1,918,082
AUTOMATIC PILOT FOR DIRIGIBLE CRAFT
Filed Aug. 25, 1931   7 Sheets-Sheet 7
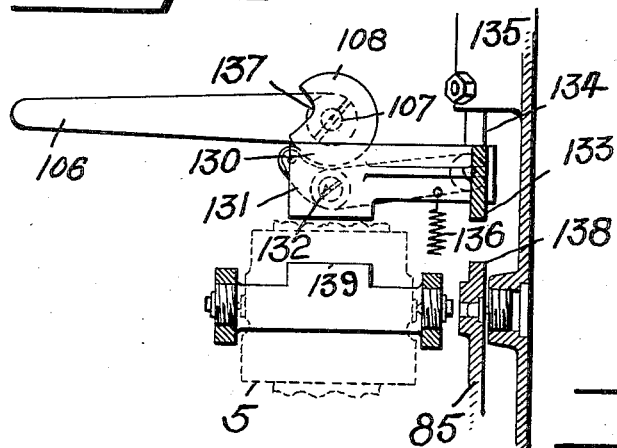
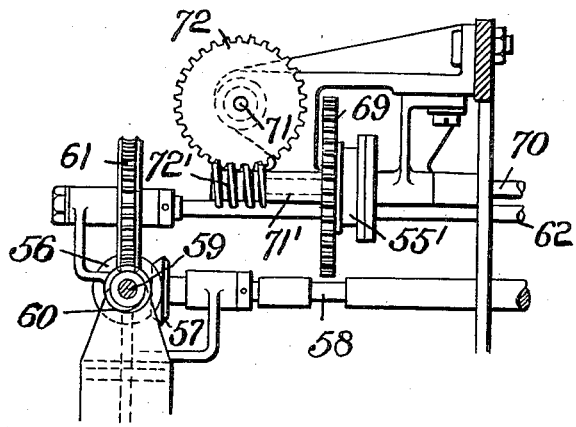
INVENTOR
Bert G. Carlson.
BY
ATTORNEY.

Patented July 11, 1933

1,918,082

UNITED STATES PATENT OFFICE

BERT G. CARLSON, OF ELMHURST, NEW YORK, ASSIGNOR TO SPERRY GYROSCOPE COMPANY, INC., OF BROOKLYN, NEW YORK, A CORPORATION OF NEW YORK

AUTOMATIC PILOT FOR DIRIGIBLE CRAFT

Application filed August 25, 1931. Serial No. 559,160.

This invention relates to automatic pilots for dirigible craft, such as aircraft, which requires control in three planes. The principal object of the invention is to simplify such devices and improve the safety factors thereof so that the pilot may instantly take over the control from the automatic pilot without performing any unusual or different task from that ordinarily employed in steering and stabilizing a plane.

A further object of the invention is to simplify the method in which the airplane is controlled by the pilot through the automatic pilot.

Referring to the drawings showing the preferred forms of my invention,

Fig. 1 is a diagram illustrating the several parts of my invention.

Fig. 2 is a plan view of the box with the cover removed containing a portion of the transmission unit between the servo motors and the rudder, some parts being shown in section.

Fig. 3 is a sectional detail taken on line 3—3 of Fig. 2.

Fig. 4 is a sectional view showing the form of the spur gear differential used.

Fig. 5 is a vertical section through one end of the box taken at right angles to Fig. 2.

Fig. 6 is a front elevation of one of the safety pulleys or drums.

Fig. 7 is a vertical section of the same.

Fig. 8 is a detail plan view of the contact mechanism employed on the gyro vertical showing the barometric control.

Fig. 9 is a vertical section through the casing of the gyro vertical.

Fig. 10 is a horizontal section through the same.

Fig. 11 is a front view of the small control panel used to govern the airplane through the automatic pilot.

Fig. 12 is a vertical section through the same.

Fig. 18 is a detail view of the gyro vertical locking means.

Fig. 19 is a detail of Fig. 2.

Figure 13:
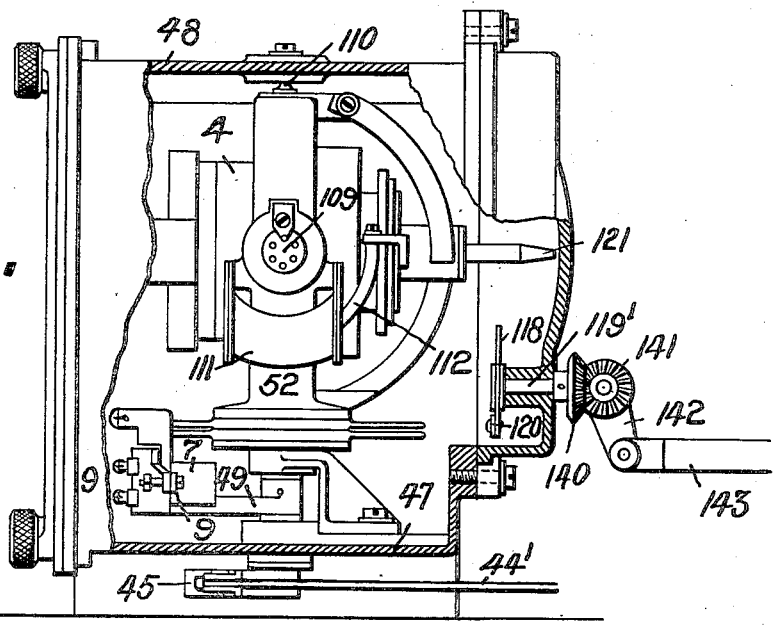
Fig. 13 is a vertical through the housing of the azimuth or directional gyroscope.

By my invention I provide an automatic control in azimuth, elevation and laterally through the usual vertical rudder 1, elevator 2, and ailerons 3 of the aircraft. As the base line for steering in azimuth I prefer to use a directional gyroscope 4 and to employ a gyro vertical or other artificial horizon 5 for the other two controls. Each gyro is provided with contacts which operate suitable clutches to control the flow of power from a wind or other motor 6 to the respective rudders. For instance, the reversing contacts 7—8 at the base of the azimuth gyroscope acting with the relatively stationary trolleys 9 control one or the other of electro-magnets 10—11 which throw clutch 12 to the right or left as the case may be to drive the shaft 13 in one direction or the other from the gears 15—16 which are rotated in opposite directions from the wind motor 6 through intermeshing gearing indicated in the diagram. Similarly shafts 13'—13" of the aileron and elevator respectively are controlled from similar contacts on the gyro vertical through the similar electro-magnets 10'—11' and 10"—11". This portion of my invention is not claimed as new and may be substantially in accordance with the disclosure in the prior application of Elmer A. Sperry, Jr. No. 289,109, filed June 29, 1928 on Automatic control of aircraft.

The shafts 13, 13' and 13" are shown in Fig. 2 as entering the servo motor box 17. Each shaft carries a worm 18 meshing with wormwheel 19 on stub shaft 20 (Fig. 5). Splined to said shaft is a toothed clutch face 21 which may be locked into engagement with the clutch face 22 on gear 23 by a ring 24 pivoted at 24' and rotatably connected to said clutch 21 by pins P. Compression spring 25 normally holds said clutch closed when toggle 26 is rocked a few degrees clockwise in Fig. 5, but when handle 27 is pushed down, toggle point 26' passes beyond the line connecting pivot points 25' and 27' and snaps the clutch open. Gear 23 is rotatably mounted on the shaft 20 as by means of ball bearing 28, but when the clutch is in engagement said gear will be driven from the shaft 20 and thus rotate gear 29. The latter is shown as secured to shaft 30 of the driving pulley or drum 31 from which cables lead directly to the elevator 2. The teeth of the clutch 21 are placed at such an angle that the clutch is automatically kicked out (due to the toggle action of spring 25) when the load thereon becomes more than a predetermined amount so that in case the mechanism jams or sticks or otherwise breaks down, the clutch is automatically disconnected so that the aviator may be free to control the plane by hand. It will be understood that a similar clutch and toggle mechanism is provided for each control and that all are thrown out and reset together by having the shaft 127 on which handle 27 is mounted extend along the front of the box 17 with a toggle 26, 26' and 26'' to each clutch (Fig. 2).

It will readily be understood that the clutch will be thrown out as above described not only due to jamming of the rudder but in case the aviator moves the rudder directly from the usual hand controls (not shown), thus placing on the clutch more than the predetermined pressure to open the same. This will disconnect the servo motor and automatic control instantly whenever it is desired to take over the control by hand and without any action on the part of the aviator other than the usual motions in governing the airplane through the regular control handles.

Likewise the pulleys have incorporated therein a safety device. As shown, the shaft 30 has keyed on the end thereof a cam 31' and within the pulley is pivoted on ears 32—33 a pair of locking arms 34. Normally the shoulders 35 on said arms rest in the notches 36 on the cam but in case the pressure becomes more than a predetermined amount the arms are pushed outwardly against the tension of the stiff leaf spring 37, thus releasing the pulley on the shaft for one revolution, at which time the arms will snap back in again. Similarly the shaft 13' for the lateral control drives the wormwheel 19' and the shaft 13'' of the azimuth control drives the wormwheel 19''.

Figure 16:
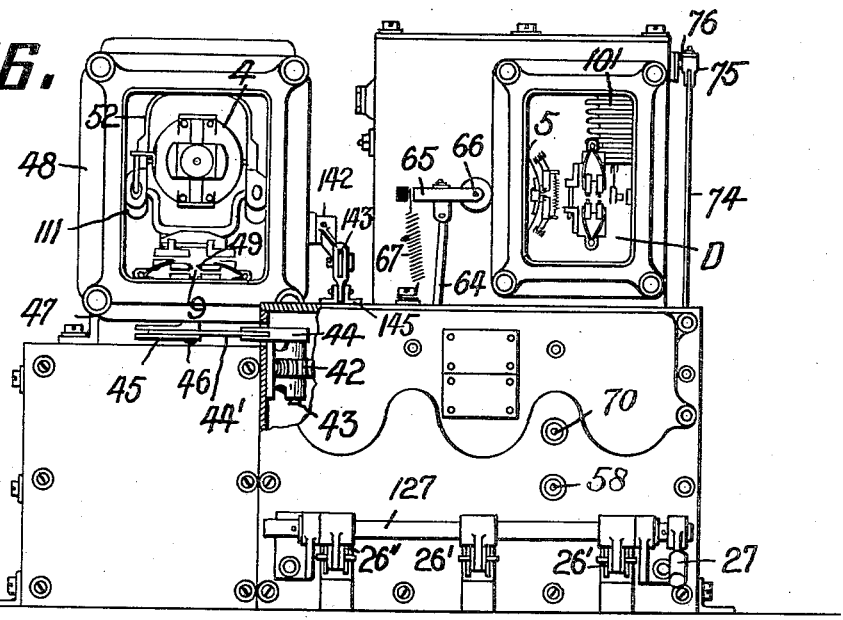
Fig. 16 is a side elevation of the complete control unit as assembled.
Figure 17:
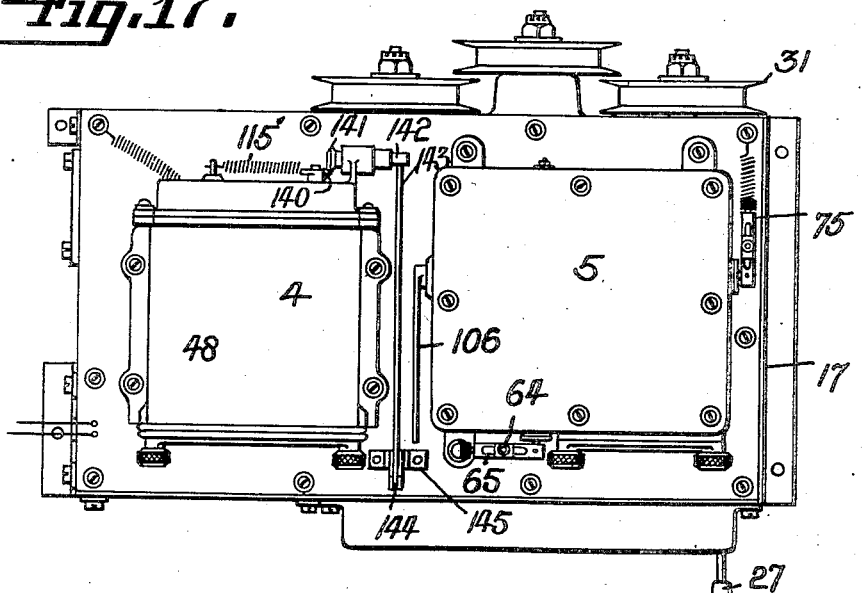
Fig. 17 is a plan view of the same.

The follow-up connection to the azimuth gyro is secured through a worm 40 on a reduced extension 41 of shaft 30'', said worm meshing with the small wormwheel 42 on the shaft 43 (Fig. 16). Said shaft carries at its upper end a crank 44 which is connected by link 44' to crank arm 45 on vertical shaft 46 journalled in the base 47 and the casing 48 of the azimuth gyroscope (Fig. 13). On said shaft is secured contact arm 49 carrying the trolleys 9 which engage the contact sectors 7 and 8 secured to the base of the vertical ring 52 of the azimuth or directional gyroscope 5.

On the shaft of wormwheel 19' is mounted a bevel gear 53 meshing with a bevel gear 54, gear 54 being secured to one arm of a differential gear train 55, the other arm being driven from a bevel gear 56, which in turn is driven from a bevel gear 57 on shaft 58. The planetary arm of said gear train drives the shaft 59 carrying a worm 60 which drives a wormwheel 61, the latter being mounted on a shaft 62. This shaft furnishes a follow-up connection to the gyro vertical for the lateral control and is shown as carrying a rocker arm 63 having pinned thereto a link 64 (see also Fig. 16) which is pinned at its upper end to a rocker arm 65 pivotally secured to a shaft 66 and normally biased downwardly by a spring 67'.

Similarly the wormwheel 19 is mounted on the shaft of the spur gear 68 meshing with a second spur gear 69, the latter forming one arm of the differential gear train 55', which may be in all respects similar to differential 55. The details of such a train arm shown in Fig. 4. The other arm of said train is driven from the shaft 70' lying under shaft 58 in Figs. 2 and 19, and the planetary arm drives shaft 71' of the worm 72' which drives wormwheel 72 on shaft 71. Shaft 71 forms a follow-up connection to the elevator control on the gyro vertical by having arm 73 secured thereto which is connected by link 74 to a rocker arm 75 on the shaft 76 entering the side of the gyro vertical casing (Figs. 16, 9 and 10).

The shafts 58 and 70 furnish means by which the plane may be controlled in elevation and laterally through the servo motor system. Convenient means for accomplishing this is to connect each of said shafts by flexible shafting 58' and 70' to the small control panel 77, the shafts being turned respectively from small knobs 78—78' through suitable bevel gears 79.

The gyro vertical comprises preferably a free gyroscope 5 universally mounted for oscillation about horizontal axes extending fore and aft and athwartship on the craft. As shown, the gimbal ring 80 is journalled on horizontal athwartship axis 81 and the gyroscope is journalled within the gimbal on normally fore and aft horizontal axis 82. The gyroscope is shown as of the airblast controlled variety in which small pendulums 83 are employed to maintain the gyroscope erect. There is also journalled on pivots 84—84' normally in line with the pivots 82 a bail or loop 85. Said loop is in the form a trackway and the gyroscope has a roller 86 engaging the same. The loop, therefore, will pick up the relative lateral tilting of the gyroscope but the gyroscope will be free to tilt fore and aft with respect thereto. The elevator contact segments are secured to a pair of discs 87—88 clamped to the gimbal ring 80 at one end, one contact segment 89 being secured to one disc and the other 90 being secured to the other disc (Fig. 8). The discs are adjustable relative to each other by a set screw 91 threaded through an ear 92 on one disc and bearing against the ear 93 on the other disc, the end of the set screw being normally held against such arm by tension spring 94. It will readily be seen that by screwing in and out on the set screw, the space between the two contact segments 89—90 may be varied, which in effect varies the width of the dead section 95. Two pairs of spaced trolleys 96 and 97 are shown bearing on the contacts, the trolleys being mounted on a bracket 98 extending from the sleeve 99.

The angular position of sleeve 99 about pivot 100 is determined by the follow-up linkage 74 connected to the shaft 76, but preferably I also introduce a barometric means for governing the height at which the plane flies. As shown, such means comprises a closed flexible diaphragm or sylphon 101 connected at one end to a forked sleeve 99 secured to the shaft 76 and at its other end to an arm 103 extending from a sleeve 104 to which bracket 98 is connected. In other words, the sylphon forms an expansible link in the follow-up connection by which its movements are superimposed in the follow-up system.

The contacts for the lateral control are similar, the follow-up connection being brought in through the shaft 67 and operating to turn the framework 105 of trolleys 96' and 97'. The contacts 89' and 90' in this case are mounted on the side of the hub 85' of loop 85. By this arrangement the two sets of contacts are positioned next to each other (Fig. 8) and both may be seen through glass door D in the gyro casing, (Fig. 16).

Means are also provided for locking the gyro vertical when not in use. Such means comprise a hand crank 106 pinned to the shaft 107 to which is also secured a cam 108. Said cam engages a roller 130 on the short arm of a bell crank lever 131 pivoted at 132. The longer arm of said lever has a pin and slot connection to an angular clamping member 133 which has secured thereto an upstanding pin 134 slidably mounted in a sleeve 135 secured to the gyro casing. With the cam in the position shown in the drawings, the angular clamping member will be raised against the action of the springs 136, but if the cam be rotated counter clockwise in Fig. 18, the roller 130 will enter the depression 137 of the cam and the springs will clamp the angular clamping member down on top of flattened surfaces 138 and 139, 138 being on a hub of the loop 85 and 139 on one end of the gimbal ring 80 thereby locking and centralizing gyroscope about both axes.

The azimuth gyro 4 is shown as mounted within a vertical ring 52 for oscillation about a horizontal axis 109, the ring in turn being mounted for rotation about a vertical axis 110 within the casing 48. For turning the airplane when under the control of the gyroscope, I have shown solenoids 111 secured to the vertical ring and with which iron cores 112 secured to the gyro casing cooperate. This or equivalent means may be employed to apply a torque in one direction or the other about the horizontal axis of the gyroscope to cause slow precession in azimuth which will, of course, cause the plane also to turn in azimuth to follow the gyroscope. This operation may also be controlled from the same control panel 77 through push buttons 113—114, one for turning left and one for turning right. As soon as both buttons are released, however, the airplane resumes a straight course as the gyroscope immediately stops precessing and maintains its new position in azimuth. Also on this panel I may provide a switch 115 for controlling the gyro vertical, a switch 116 for controlling the directional gyro, and a switch 117 for controlling the excitation of the reversing clutches.

Figure 14:
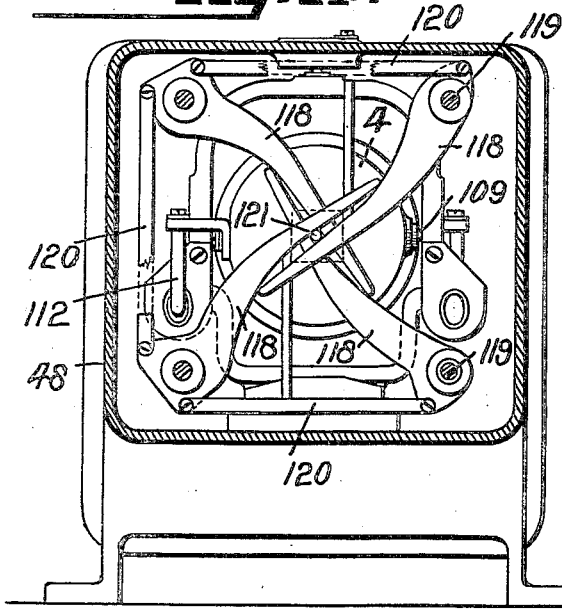
Fig. 14 is a vertical section taken at right angles to Fig. 3.
Figure 15:
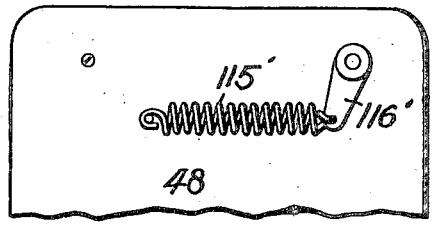
Fig. 15 is a detail.

For centralizing the azimuth gyro I show a plurality of fingers 118 each mounted on a shaft 119 spaced around the gyroscope and interconnected by links 120. In the closed position, each of said fingers engages a stub shaft 121 extending from the gyro casing as shown in Fig. 14, the fingers being resiliently held in this position by spring 115' connected to a crank arm 116' secured to the shaft 119' of one of the fingers. Preferably I control the gyro locking means automatically from the clutch throw-in and disengaging mechanism so that whenever the clutches are in, the gyro is uncaged and when the clutches are thrown out either by means of handle 27 or automatically from overloading the gyro is caged or locked. For this purpose there is shown mounted on shaft 119' of one of the fingers a bevel gear 140 meshing with a second bevel gear 141 having a crank arm 142 to which is pinned a link 143. Said link at the opposite end is connected to a bell crank lever 144 pivoted at 145 on the gyro case, the opposite end of said lever being connected to a vertical link 146 pinned to the bell crank lever 26 which operates the clutch throw-out mechanism. When, therefore, the clutch is thrown in, the linkage system is moved to open the fingers or caging mechanism but when the clutch is kicked or thrown out the cage is released.

It will also be understood that limit switches are provided for each rudder. Such switches are represented diagrammatically at S, S' and S" in Fig. 1, the switches opening the circuit to the clutch coil 10 or 11 when the rudder reaches its limit in that direction but leaving the circuit closed to the other clutch coil.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an automatic pilot for dirigible craft, the combination with the usual hand controls permanently connected to the rudder, of a servo motor control, and means for releasing the latter upon a predetermined pressure being applied to turn the rudder whereby the rudder may be moved by said hand controls without turning the servo motor.

2. In an automatic pilot for dirigible craft, the combination with the usual hand controls for a rudder, of an alternative automatic control including a gyroscopic baseline, a servo motor actuated therefrom and reduction gearing, and means for automatically disconnecting the hand controls and the rudder from the servo motor and gearing brought into action when greater than a predetermined torque is exerted on the rudder.

3. In an automatic pilot for dirigible craft, the combination with the usual hand controls for a rudder, of a servo motor control, and mechanically operated means for releasing the latter automatically when more than a predetermined pressure is exerted on the hand controls whereby the rudder may be moved by said hand controls without turning the servo motor.

4. In an automatic pilot for dirigible craft, the combination with the usual hand controls for a rudder, of a steering gyroscope, a servo motor controlled therefrom, and, means for releasing the latter and locking the gyroscope upon a predetermined pressure being applied to turn the rudder whereby the rudder may be moved by said hand controls without the servo motor.

5. In an automatic pilot for aircraft, an artificial horizon for governing the elevator, a follow-back connection from the elevator to said horizon, and barometric means interposed in said connection to maintain a predetermined altitude of flight.

6. In an automatic pilot for aircraft, an artificial horizon for governing the elevator, means brought into action by relative tilting of the craft and horizon for operating the rudder, barometric means mechanically connected to said other means to maintain a constant altitude, and manual means mechanically connected to said barometric means for changing the altitude of flight.

7. In a gyro vertical, the combination with the gyro, gimbal means for mounting the same for oscillation about major and minor horizontal axes, a bail independently pivoted about an axis normally in line with said minor axis, and locking means for simultaneously locking the gyroscope about both axes comprising a member adapted to engage both the gimbal and said bail to centralize the same.

8. In an automatic pilot for aircraft, a servo motor, a rudder normally controlled therefrom, an alternative direct hand control permanently connected to the rudder, and mechanical throw-out means between the servo motor and rudder which automatically disconnects the servo motor when pressure is exerted on the hand control to operate the rudder by hand.

9. In a caging and centralizing device for universally mounted gyroscopes, the combination with the gyroscope, of a pin projecting therefrom, a plurality of fingers pivoted around the gyroscope, and means for simultaneously turning all fingers toward said pin to engage the pin and centralize it at the common center of the pivots of the fingers.

10. In a caging and centralizing device for universally mounted gyroscopes, the combination with the gyroscope, of a pin projecting therefrom, a plurality of fingers pivoted around the gyroscope, and means for simultaneously turning all fingers toward and away from said pin to cage and uncage the gyroscope including cross links connecting said fingers and a spring for biasing the fingers in one position.

In testimony whereof I have affixed my signature.

BERT G. CARLSON.